(12) United States Patent
Takeuchi et al.

(10) Patent No.: US 6,180,042 B1
(45) Date of Patent: Jan. 30, 2001

(54) PROCESS FOR PRODUCING MOLDED ARTICLE MADE OF SYNTHETIC RESIN

(75) Inventors: Atsushi Takeuchi; Minoru Makuta; Hitoshi Ohgane, all of Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 08/744,987

(22) Filed: Nov. 7, 1996

(30) Foreign Application Priority Data

Nov. 8, 1995 (JP) .................................................... 7-289941

(51) Int. Cl.[7] ............................. B29C 45/16; B60R 19/03
(52) U.S. Cl. ........................ 264/255; 264/328.8; 293/120
(58) Field of Search ................... 264/255, 328.8, 264/513, 245, 45.1, 46.6; 425/130, 523; 293/120

(56) References Cited

U.S. PATENT DOCUMENTS

| | | | |
|---|---|---|---|
| 4,174,413 | * 11/1979 | Yasuike et al. | 428/35 |
| 5,059,361 | * 10/1991 | Da Re' | 264/25 |
| 5,374,178 | * 12/1994 | Nakayama | 425/130 |
| 5,433,910 | 7/1995 | Mukai et al. | 264/255 |
| 5,645,786 | * 7/1997 | Okada et al. | 264/255 |

FOREIGN PATENT DOCUMENTS

| | | |
|---|---|---|
| 37 11 079 | 10/1988 | (DE) . |
| 2087299A | * 5/1982 | (GB) . |
| 63-000055 | * 1/1988 | (JP) . |
| 4-267114 | 9/1992 | (JP) . |
| 321621 | 12/1997 | (TW) . |

* cited by examiner

Primary Examiner—Jan H. Silbaugh
Assistant Examiner—Suzanne E. McDowell
(74) Attorney, Agent, or Firm—Arent Fox Kintner Plotkin & Kahn PLLC

(57) ABSTRACT

In producing a molded article of a synthetic resin, the following steps are used: a step of injecting an outer layer forming material into a molding cavity through a gate in a mold; a step of injecting a core forming material to allow the core forming material to flow into the outer layer forming material existing in the gate and the cavity and to allow the outer layer and core forming materials to flow within the cavity, thereby advancing the formation of the first construction portion; a step of allowing a front portion of the core forming material in a flowing direction to break through a front portion of the outer layer forming material in the flowing direction to flow into said cavity, thereby advancing the formation of the second construction portion under advancement of the first construction portion; and a step of pushing both the materials existing within the gate into said cavity by the outer layer material, thereby completing the formation of the first and second construction portion. Thus, it is possible to mass-produce a molded article of a synthetic resin including the first construction portion having a sandwich structure including a core and an outer layer, and the second construction portion having a single-layer structure.

8 Claims, 11 Drawing Sheets

PROCESS FOR PRODUCING MOLDED ARTICLE MADE OF SYNTHETIC RESIN

BACKGROUND OF THE INVENTION

1. Field of the Invention

The present invention relates to a process for producing a molded article of a synthetic resin and particularly, to a process for producing a molded article of a synthetic resin, including a first construction portion having a sandwich structure including a core and an outer layer covering the core, and a second construction portion connected to the first construction portion and having a single-layer structure.

2. Description of the Related Art

For example, a bumper for an automobile vehicle is conventionally known as such a synthetic resin molded article having a sandwich structure as described above (for example, see Japanese Patent Application Laid-open No. 4-267114).

In this known bumper, a pulverized material derived from a recovered bumper of a synthetic resin is used as a core forming material for the bumper. This is effective for enabling the recovered bumper to be reutilized, thereby providing a reduction in industrial waste, a resources saving and a preservation of environment.

To promote the reutilization of the recovered bumper, it is required to increase the amount of core forming material derived from the recovered bumper, which is used in a bumper to be produced.

SUMMARY OF THE INVENTION

Accordingly, it is an object of the present invention to provide a process for producing a synthetic resin molded article of the above-described type, which is capable of meeting the above requirement.

To achieve the above object, according to the present invention, there is provided a process for producing a molded article of a synthetic resin including a first construction portion having a sandwich structure comprised of a core and an outer layer covering the core, and a second construction portion integrally formed with the first construction portion and having a single-layer structure, the process comprising: a first step of injecting an outer layer forming material into a molding cavity through a gate in a metal mold; a second step of injecting a core forming material to allow the core forming material to flow into the outer layer forming material existing in the gate and the cavity and to allow the outer layer and core forming materials to flow into the cavity, thereby advancing the formation of the first construction portion; a third step of allowing a front portion of the core forming material in a flowing direction to break through a front portion of the outer layer forming material in the flowing direction and allowing the core forming material to flow into the cavity, thereby advancing the formation of the second construction portion under advancement of the formation of the first construction portion; and a fourth step of pushing the outer layer and core forming materials of a double structure existing within the gate into the cavity by the outer layer material, thereby completing the formation of the first and second construction portion.

With this method, the amount of use of the core forming material derived from the recovered bumper can be increased by selecting the bumper as the synthetic resin molded article and a non-conspicuous bumper lower edge as the second construction portion. In addition, it is possible to mass-produce such a synthetic resin molded article of a high quality including first and second construction portions.

The synthetic resin molded article is not limited to the bumper and may be a cowl top garnish, wherein the second construction portion thereof is a portion located below a bonnet. In this case, the outer layer of the first construction portion is conspicuous and requires a weather resistance. Therefore, PP (polypropylene) containing a weather resistant stabilizer is used as the outer layer forming material. Only PP is used as the core forming material.

The above and other objects, features and advantages of the invention will become apparent from the following description of a preferred embodiment taken in conjunction with the accompanying drawings.

DETAILED DESCRIPTION OF THE PREFERRED EMBODIMENT

The present invention will now be described by way of preferred embodiments with reference to the accompanying drawings.

Figure 1:
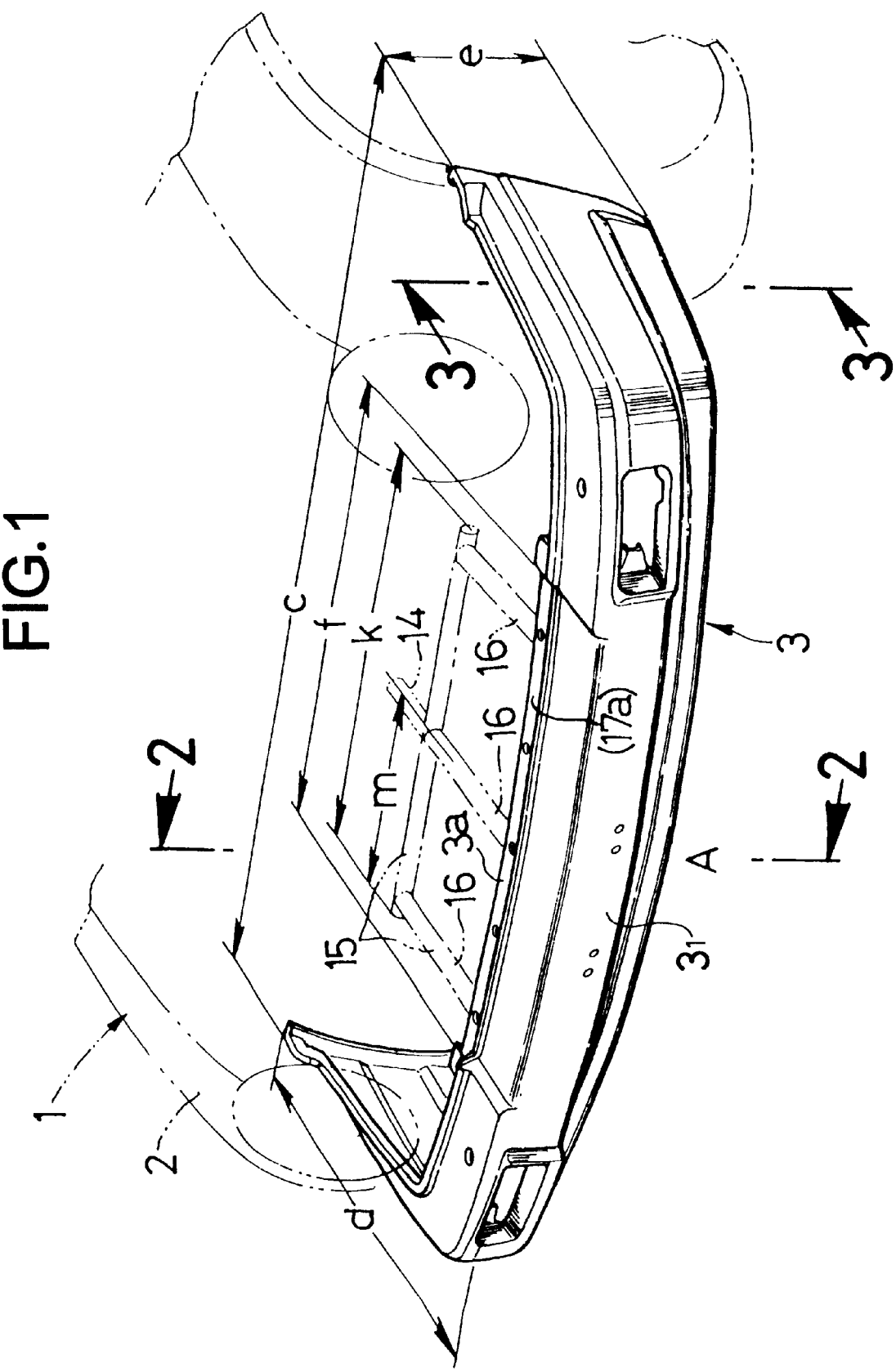
FIG. 1 is a perspective view of a bumper.
Figure 2:
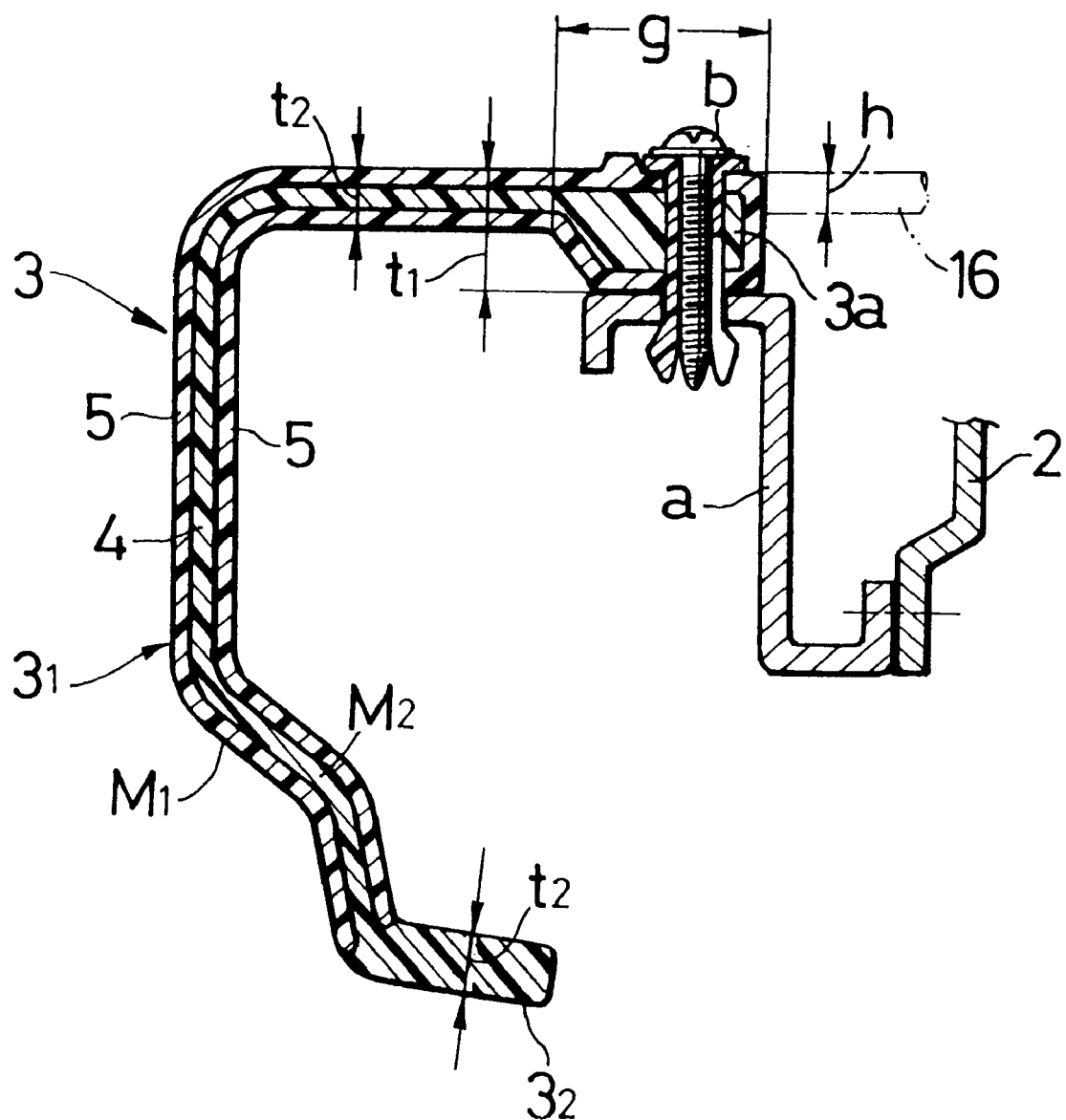
FIG. 2 is a sectional view taken along the line 2—2 in FIG. 1.
Figure 3:
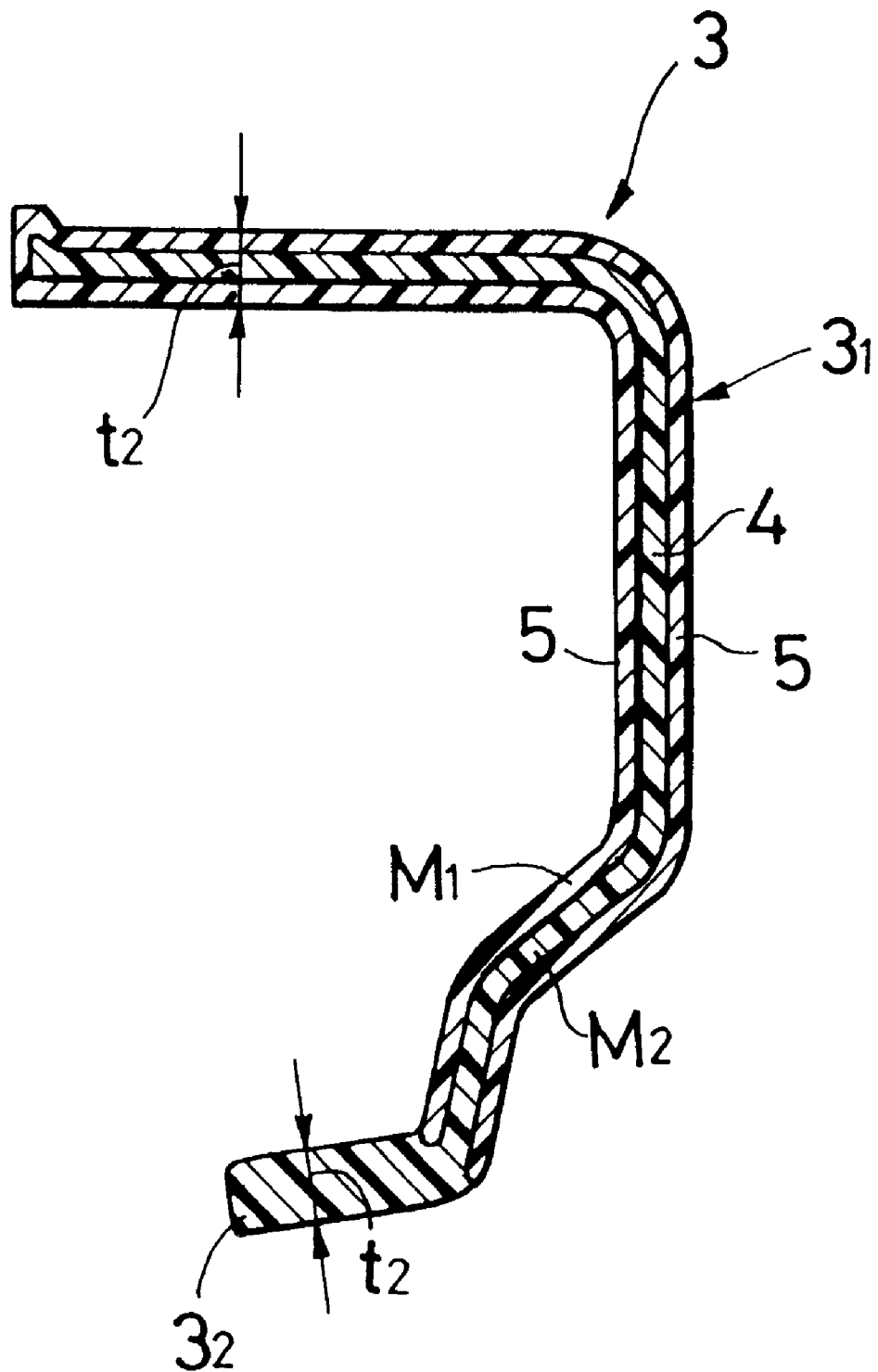
FIG. 3 is a sectional view taken along the line 3—3 in FIG. 1.

Referring to FIGS. 1 to 3, a bumper 3 made of a synthetic resin as a synthetic resin molded article is mounted to a front portion of a vehicle body 2 of an automobile vehicle 1. A main bumper portion $3_1$ extends from an upper edge to near a lower edge of a front portion of the bumper and from upper edges of opposite sides to near lower edges of the front portion of the bumper. The main bumper portion $3_1$ has a sandwich structure which includes a core 4, and an outer layer 5 covering the core 4. A bumper lower edge (a second construction portion) $3_2$ integrally formed to the main bumper portion $3_1$ to extend over the entire length of the lower edge has a single layer structure. In the main bumper structure $3_1$, a band-like mounting portion 3a for mounting to the vehicle body to extend laterally from a central portion A of the vehicle body forms approximately one third of a rear edge of a front and upper portion of the bumper 3. The band-like mounting portion 3a has a thickness $t_1$ larger than a thickness $t_2$ of the main bumper portion $3_1$ excluding the mounting portion 3a and the bumper lower edge $3_2$. For example, a relation, $t_1 \geq 1.5\, t_2$ is established between both the thicknesses $t_1$ and $t_2$.

The mounting portion 3a is mounted to one end of a beam $a$ made of a steel plate by a plurality of clips $b$, and the other end of the beam $a$ is mounted to the vehicle body 2. Therefore, to increase of the thickness $t_1$ of the mounting portion 3a is effective for enhancing the mounting strength of the bumper 3.

The core 4 is formed from a main material which is produced by pulverizing a recovered bumper formed using a polypropylene (PP) modified by an ethylene-propylene rubber (EPR) and having a thermoplastic synthetic resin coating on a surface. The outer layer 5 is formed from a main material which is a polypropylene modified by an ethylene-propylene rubber.

Figure 4:
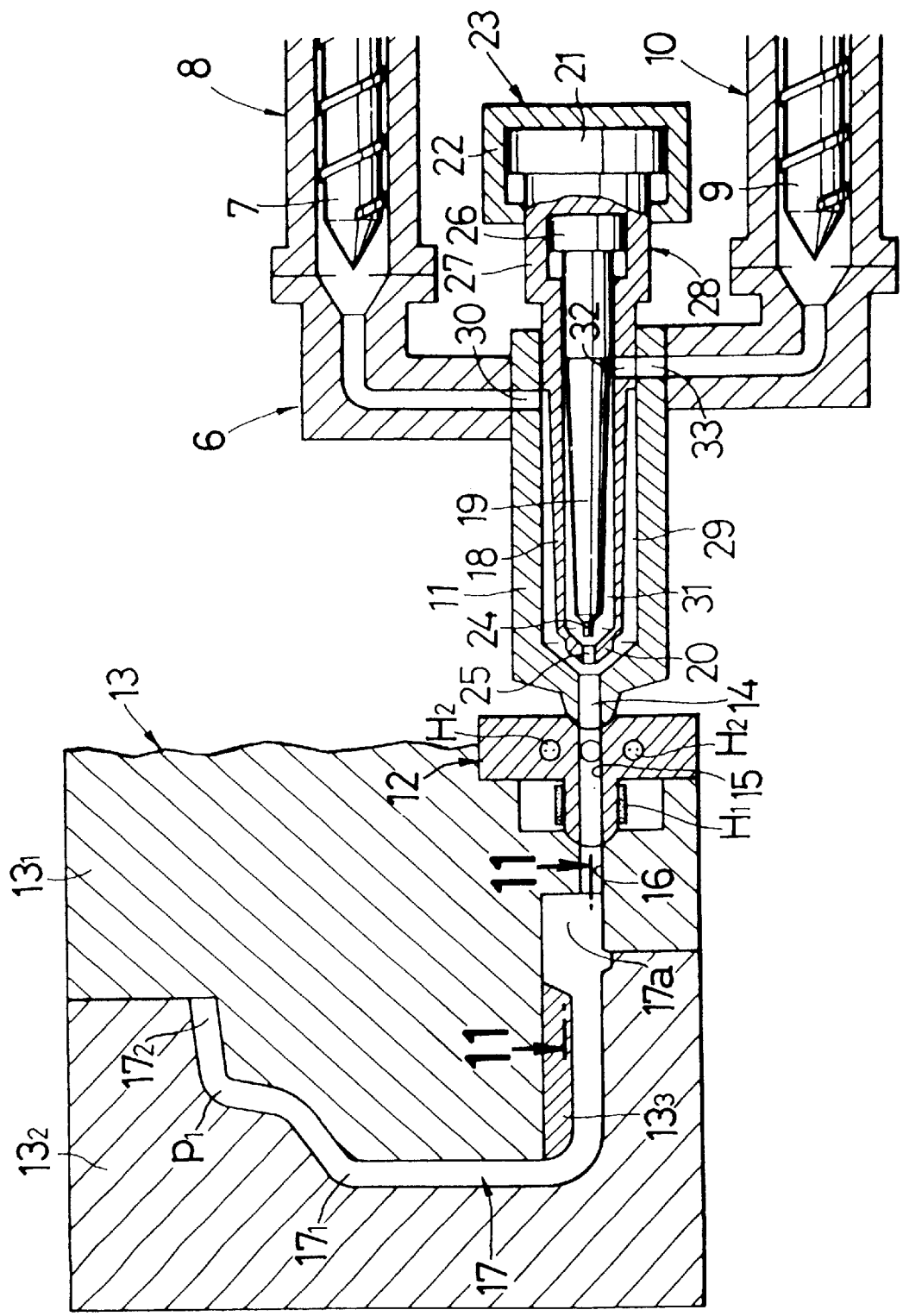
FIG. 4 is a vertical sectional view of an injection molding apparatus.
Figure 5:
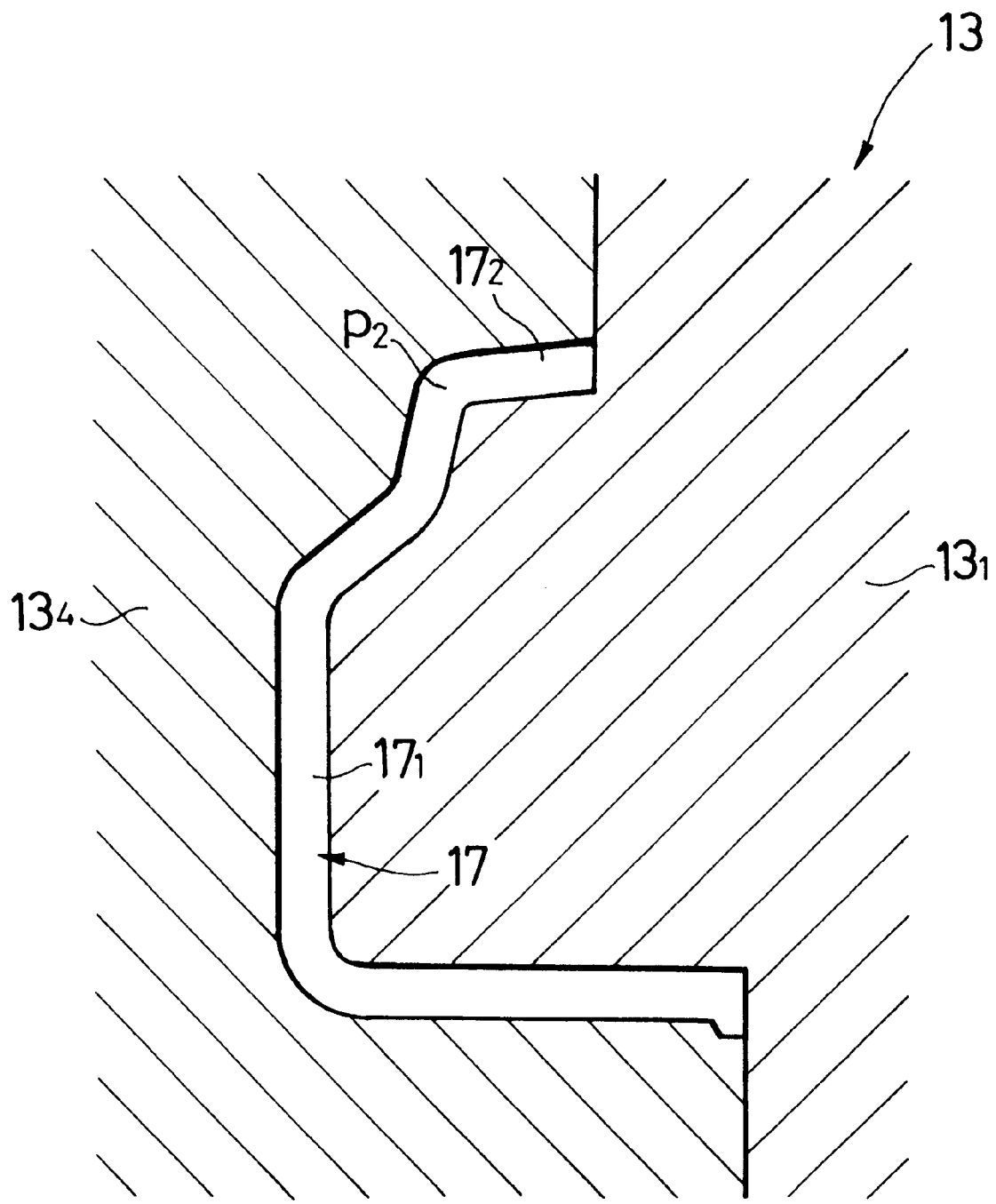
FIG. 5 is a vertical sectional view of a mold, corresponding to FIG. 3.

Referring to FIG. 4 an injection molding apparatus 6 used for producing the bumper 3 includes a first injection unit 8 having a screw 7 to inject an outer layer forming material, a second injection screw 10 having a screw 9 to inject a core forming material, a nozzle 11 which connects both the injection units 8 and 10 to each other, a hot runner block 12 connected to the nozzle 11, and a split metal mold 13 detachably mounted to the hot runner block 12. As also shown in FIG. 5, the metal mold 13 includes a stationary die $13_1$ mounted on the hot runner block 12, and a plurality of movable dies $13_2$ to $13_4$ which are movable toward and from the stationary die $13_3$.

A supply passage 14 in the nozzle 11 communicates with a plurality of gates 16 in the metal mold 13 through a hot runner 15. Each of the gates 16 communicates with a mounting portion forming area 17a in a main bumper portion forming area $17_1$ of a bumper forming cavity 17. The mounting portion forming area 17a has a volume which is set such that the thickness $t_1$ of the mounting portion 3a is larger than the thickness $t_2$ of the bumper main portion $3_1$ and the bumper lower edge $3_2$. In this case, the shape of the cavity 17 in FIG. 4 corresponds to FIG. 2, and the shape of the cavity 17 corresponds to FIG. 3. In Figures, $H_1$ is a band heater, and $H_2$ is a cartridge heater.

A hollow outer needle 18 and a solid inner needle 19 are disposed concentrically within the nozzle 11. In the outer needle 18, a valve portion 20 at a tip end of the needle 18 is opposed to the supply passage 14, and a piston 21 is provided at a base end of the needle 18 and slidably received in a cylinder 22. The piston 21 and the cylinder 22 constitute a supply passage opening/closing mechanism 23. In the inner needle 19, a valve portion 24 at a tip end is opposed to a valve bore 25 formed in the valve portion 20 of the outer needle 18, and a piston 26 is provided at a base end and slidably received in a cylinder 27 formed at the base end of the outer needle 18. The piston 26 and the cylinder 27 constitute a valve bore opening/closing mechanism 28.

The outer needle 18 has a tapered outer peripheral surface connected to the valve portion 20, and an outer passage 29 is formed between the tapered outer peripheral surface and an inner peripheral surface of the nozzle 11. The outer passage 29 is adapted to communicate at one end thereof with the supply passage 14 and at the other end thereof with the first injection unit 8 through a through-hole 30 in the nozzle 11. The outer needle 18 has a straight outer peripheral surface at its base end, so that the through-hole 30 can be closed by such outer peripheral surface.

The inner needle 19 has a tapered outer peripheral surface connected to the valve portion 24 thereof, and an inner passage 31 is formed between such tapered outer peripheral surface and the inner peripheral surface of the outer needle 18. The inner passage 31 is adapted to communicate at one end thereof with the valve bore 25 and at the other end thereof with the second injection unit 10 through through-holes 32 and 33 in the nozzle 11. The inner needle 19 has a straight outer peripheral surface at its base end, so that the through-hole 32 can be closed by such outer peripheral surface.

A specific example of the production of the bumper 3 using the injection molding apparatus 6 will be described below.

Referring to FIGS. 1 and 2, the dimensions of portions of the bumper 3 are as follows: on the basis of the vehicle body 2, the lateral length $c=1700$ mm; the longitudinal length $d=550$ mm, the height $e=300$ mm; the lateral length $f$ of the mounting portion $3a=1200$ mm; the longitudinal length $g$ of the mounting portion $3a=40$ mm; the thickness $t_1$ of the mounting portion $3a=6$ mm; and the thickness $t_2$ of the main bumper portion $3_1$ and the bumper lower end $3_a$ excluding the mounting portion $3a=4$ mm. Therefore, a relation, $t_1=1.5\ t_2$ is established between both the thicknesses $t_1$ and $t_2$.

The dimensions of portions of the cavity 17 are determined depending upon the shape of the bumper 3. In this case, the number of the gates 16 is three; the diameter $h$ of the gate $16=1.5$ mm; the lateral length $k$ of the hot runner $15=900$ mm; and the length $m$ between a center line of the supply passage 14 and the left and right ends of the hot runner $15=450$ mm.

A. Preparation of Core Forming Material

A recovered bumper molded using a polypropylene modified by an ethylene-propylene rubber and having a two-pack urethane coating on a surface thereof was selected. The composition of the recovered bumper is as follows:

| | |
|---|---|
| Polypropylene | 64% by weight |
| Ethylene-propylene rubber | 28% by weight |
| Talc | 7% by weight |
| Coating | 1% by weight |

The recovered bumper was thrown into a pulverizer and pulverized therein. Then, the pulverized material was thrown into and molten and kneaded in a granulator. The resulting molten/kneaded material was passed through a filter of 80 to 100 mesh, whereby large particles were removed. Thereafter, the molten/kneaded material was passed through a capillary having an inside diameter of 1 mm to form a linear material. The linear material was cut into a length of 1 to several mm to provide a pellet-like core forming material.

B. Preparation of Outer Layer Forming Material

| A mixture including | |
|---|---|
| Polypropylene | 63% by weight |
| Ethylene-propylene rubber | 30% by weight |
| Talc | 7% by weight | to provide the same composition as the recovered bumper (however, the coating is excluded) was thrown into the granulator and subjected to the same procedure as in the above-described item A to produce a pellet-like outer later forming material.

C. Production of Bumper (i) In FIG. 4 the outer layer forming material was placed into the first injection unit 8 and maintained in a molten state of 210° C. The core forming material was placed into the second injection unit 10 and maintained in a molten state of 200° C. The preheating temperatures of the stationary die $13_1$ and the movable dies $13_2$ to $13_4$ are 40° C. and 50° C., respectively.

Figure 6:
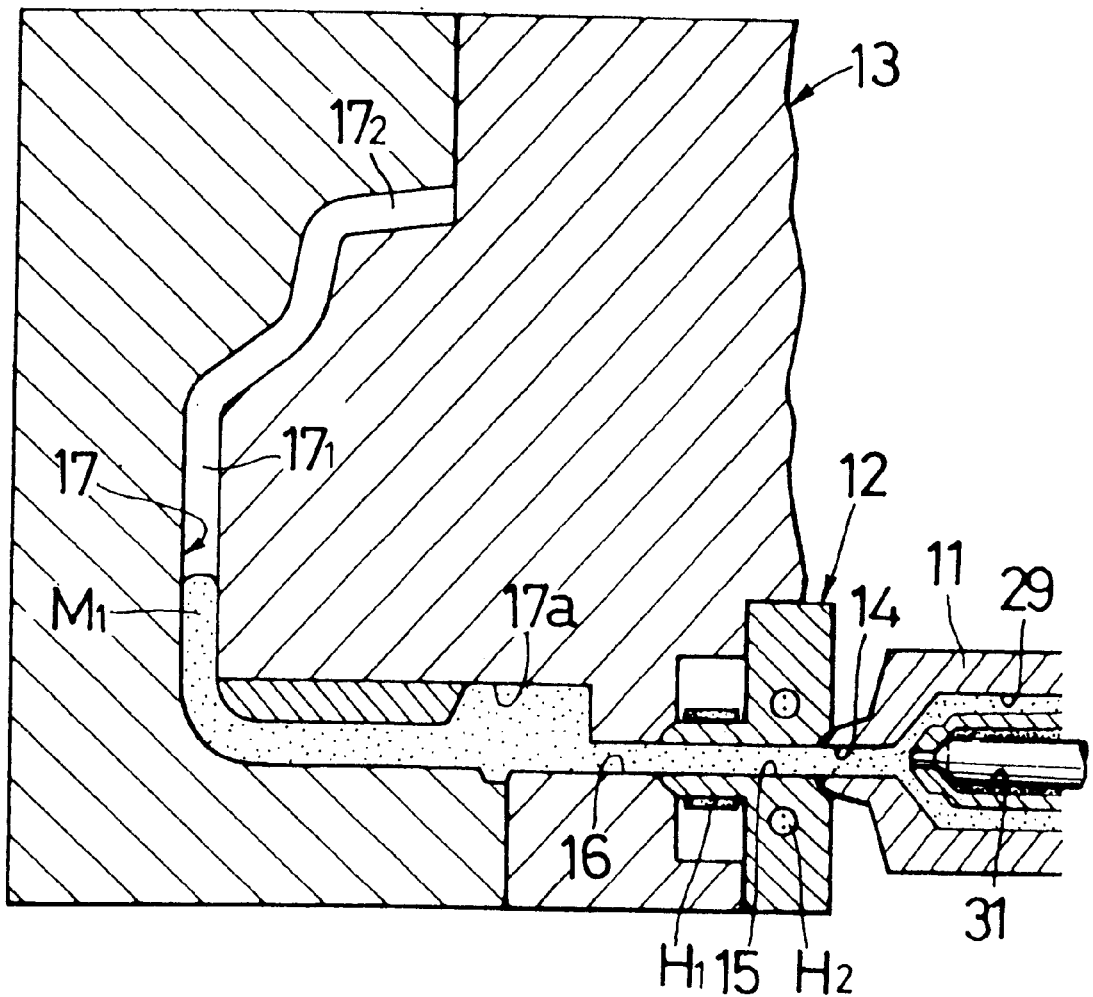
FIG. 6 is a view for explaining a first step.

(ii) At a first step, in a condition in which the outer passage 29 was in a connected state and the inner passage 31 was in a disconnected state, the outer layer forming material $M_1$ was injected into the bumper forming cavity 17 through the supply passage 14, the hot runner 15 and the gates 16 under operation of the first injection unit 8, as shown in FIG. 6.

Figure 7:
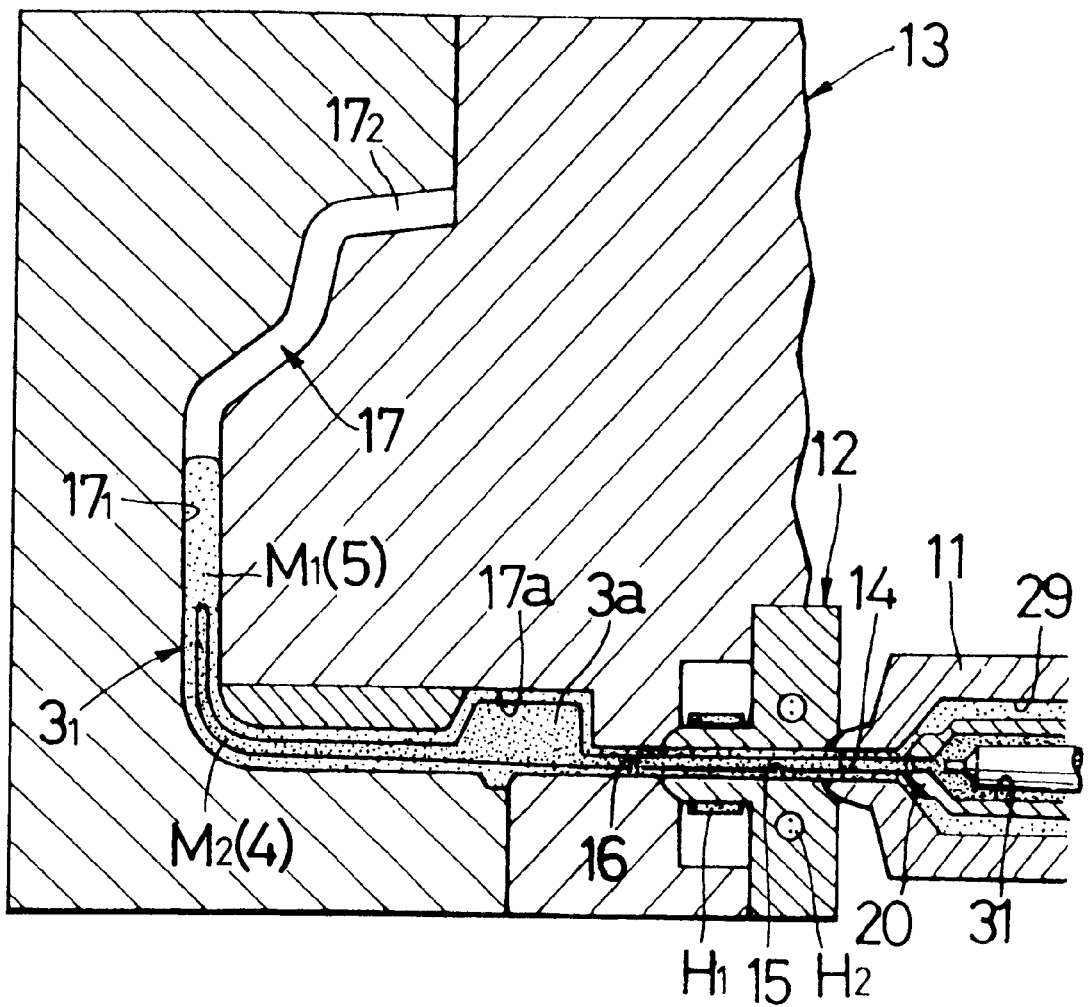
FIG. 7 is a view for explaining a second step.

(iii) At a second step, a portion of the outer passage 29 adjacent the supply passage 14 was throttled by the valve portion 20 under operation of the first injection unit 8, as shown in FIG. 7. In a condition in which the inner passage 31 was in a connected state, the core forming material $M_2$ was injected under operation of the second injection unit 10, whereby the core forming material $M_2$ was allowed to flow into the outer layer forming material $M_1$ in the supply passage 14, the hot runner 15, the gates 16 and the cavity 17, and the outer layer and core forming materials $M_1$ and $M_2$ were allowed to flow within the main bumper portion forming area $17_1$ of the cavity 17, thereby causing the formation of the main bumper portion $3_1$ to advance.

Figure 8:
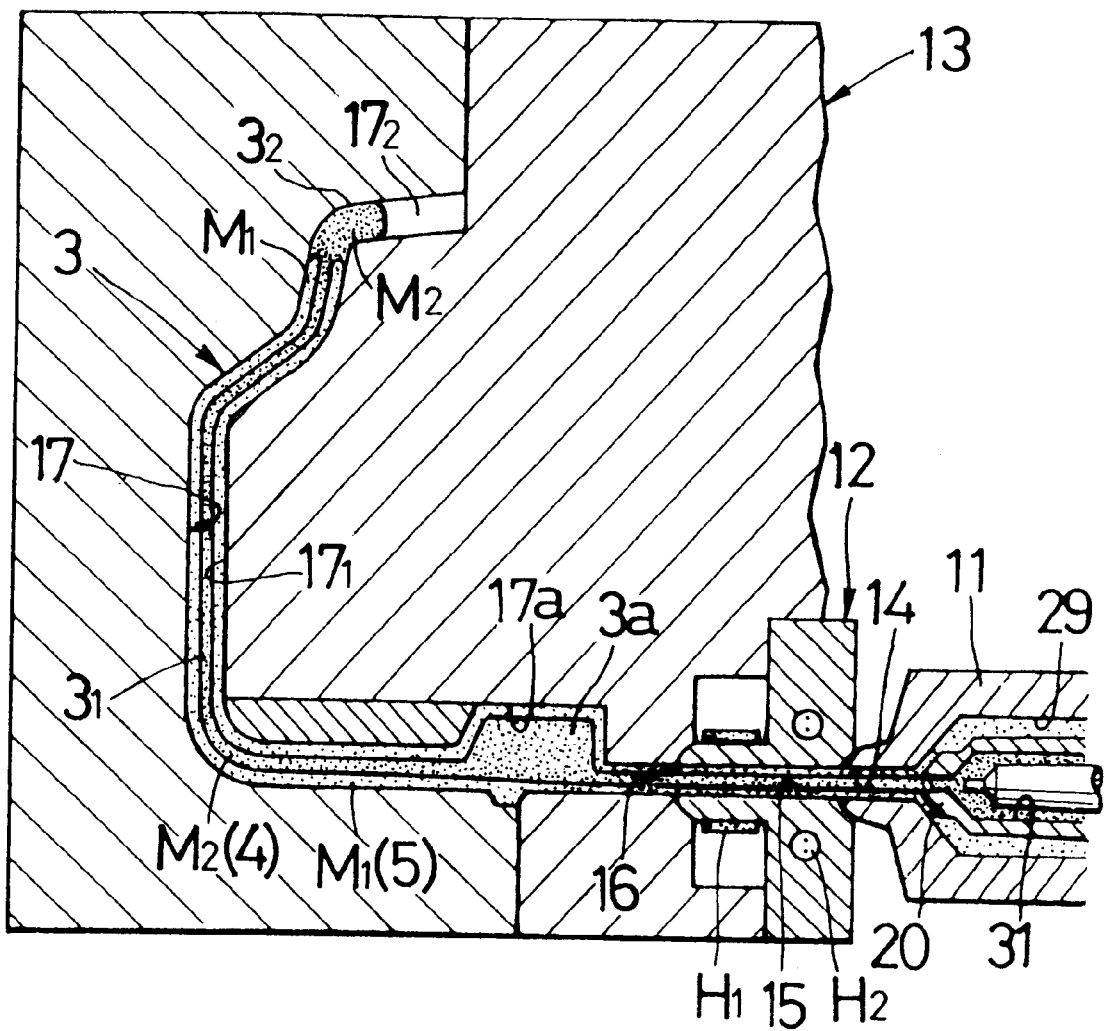
FIG. 8 is a view for explaining a third step.

(iv) At a third step, as shown in FIG. 8 in the condition in which the outer passage 29 and the inner passage 31 were in the connected states, a front portion of the core forming material $M_2$ in a flowing direction is allowed to break through a portion of the outer layer forming material $M_1$, so that the core forming material $M_2$ flows within the bumper lower edge forming area $17_2$. This causes the formation of the bumper lower edge $3_2$ to advance under an advancement of the formation of the bumper main portion $3_1$. Then, the operation of the second injection unit 10 was stopped.

Figure 9:
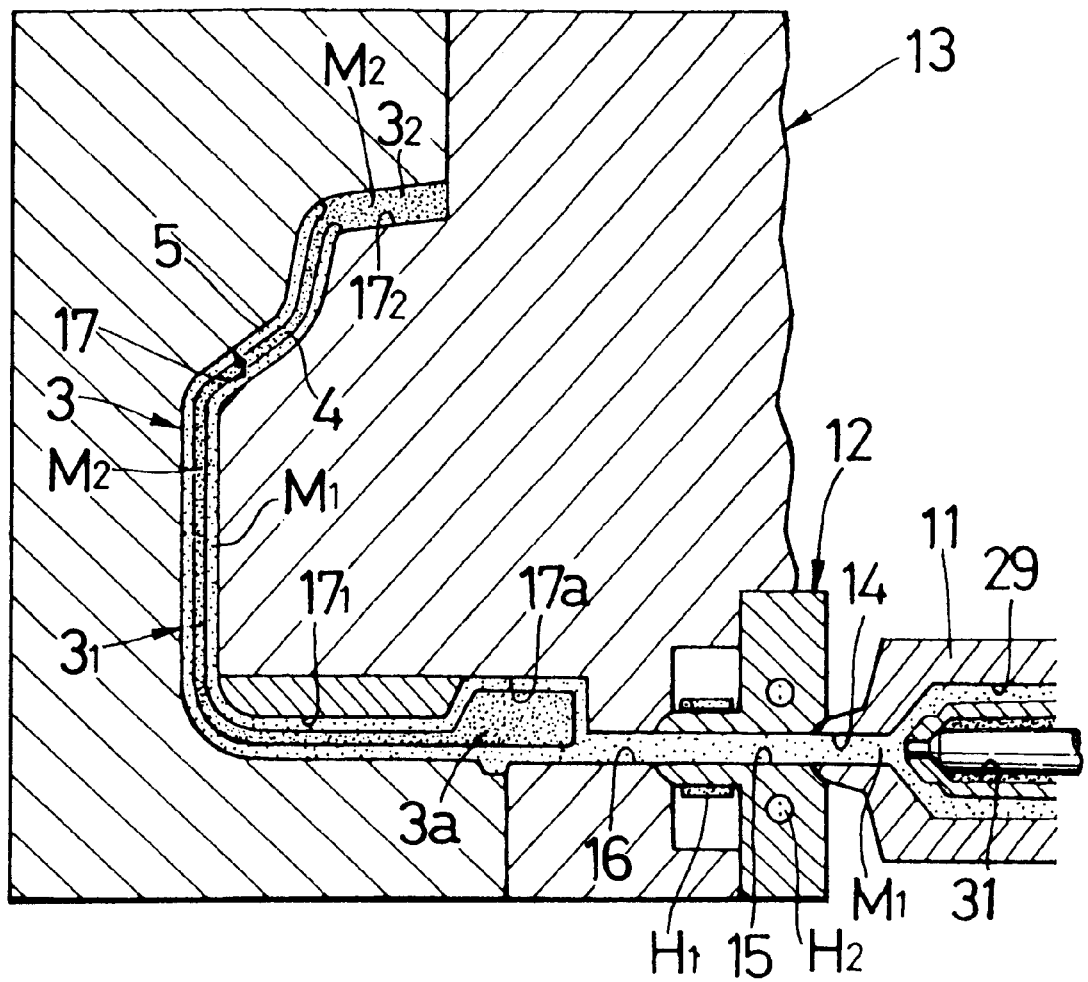
FIG. 9 is a view for explaining a fourth step.

(v) At a fourth step, as shown in FIG. 9 in a state in which the outer passage 29 is in the connected state and the inner passage 31 is in the disconnected state, the outer layer and core forming materials $M_1$ and $M_2$ of a double structure existing within the supply passage 14, the hot runner 15 and the gates 16 were pushed into the cavity 17 by the outer layer forming material $M_1$ under operation of the first injection unit 8, thereby completing the formation of the bumper main portion $3_1$ and the bumper lower edge $3_2$. Then, the operation of the first injection unit 8 was stopped.

(vi) The metal mold 13 was moved away from the hot runner block 12 and then, the mold opening was conducted to provide a bumper 3.

After the above-described producing process, the outer layer forming material $M_1$, is retained in a molten state within the hot runner 15 and hence, the molding of the bumper 3 can be carried out continuously.

Table 1 shows the injection time and the injection speed for the outer layer forming material $M_1$ and the core forming material $M_2$ relating to the first, second, third and fourth steps in the production of the bumper 3.

TABLE 1

|  | Outer layer forming material | | Core forming material | |
| --- | --- | --- | --- | --- |
|  | Injection speed (mm/sec) | Injection time (sec) | Injection speed (mm/sec) | Injection time (sec) |
| First step | Va | 46.0 | 3.8 | — | — |
| Second step | Va | 46.0 | 1.5 | Ve | 48.4 | 1.5 |
| Third step | Vb | 24.7 | 2.0 | Ve | 48.4 | 2.8 |
|  | Vc | 15.1 | 0.8 |  |  |
| Fourth step | Vc | 15.1 | 1.0 | — | — |
|  | Vd | 9.7 | 2.4 |  |  |

Figure 10:
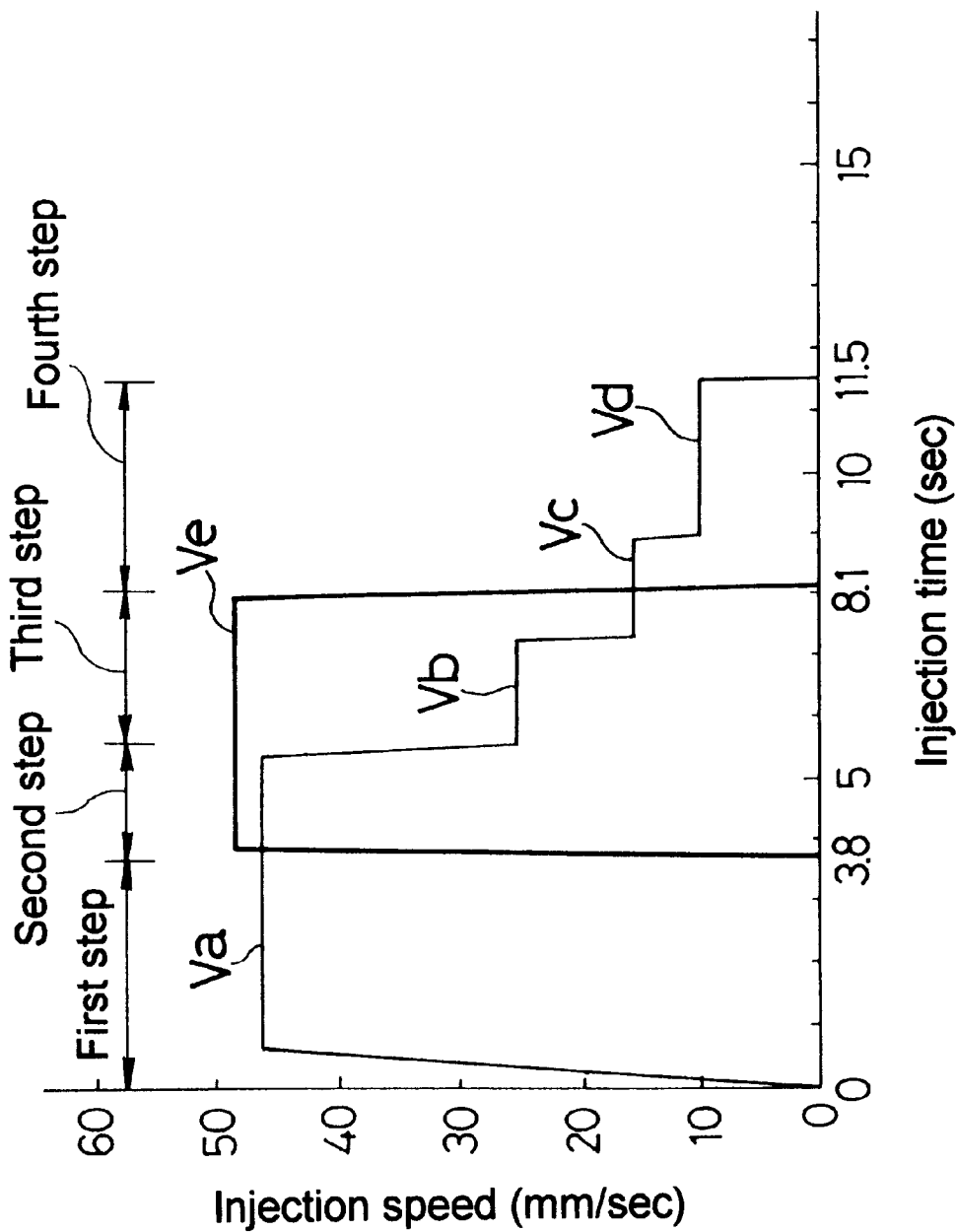
FIG. 10 is a graph illustrating the relationship between the injection time and the injection speed.

FIG. 10 is based on Table 1 and shows the relationship between the injection time and the injection speed. In this case, the injection speed was controlled at one stage for the outer layer forming material $M_1$ at the first step; at one stage for the core forming material $M_2$ and the outer layer forming material $M_1$ the second step; at two stages for the outer layer forming material $M_1$ and at one stage for the core forming material $M_2$ at the third step; and at two stages for the outer layer forming material at the fourth step.

Figure 11:
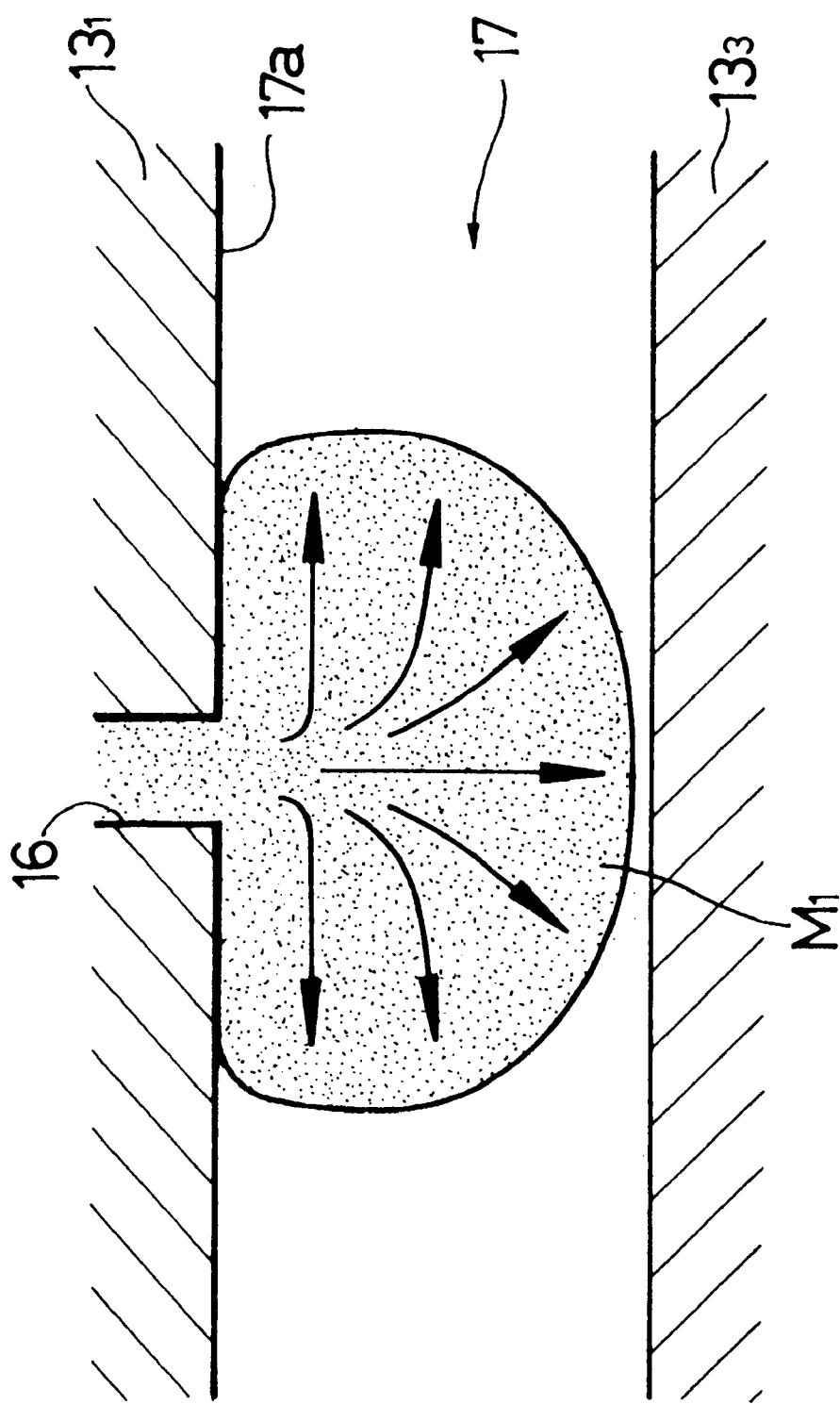
FIG. 11 is a sectional view taken along the line 11—11 in FIG. 4 illustrating a flowing of an outer layer forming material.

If the volume of the mounting portion forming area $17a$ of the cavity 17 is set so that it is increased in accordance with the thickness $t_1$ of the mounting portion $3a$, as described above, the resistance to the flow of the outer layer forming material $M_1$ in the mounting portion forming area $17a$ is decreased and hence, the capability to distribute the material in a lengthwise direction of the cavity in the area $17a$ is enhanced, as shown in FIG. 11. As a result, a difference is decreased between the time taken for the outer layer forming material $M_1$ to reach a terminal end $p_1$ of the bumper main portion forming area $17_1$ nearer the mounting portion forming area $17a$ in FIG. 4 and the time taken for the outer layer forming material $M_1$ to reach a terminal end $p_2$ of the bumper main portion forming area $17_1$ remoter from the mounting portion forming area $17a$ in FIG. 5. Thus, the core forming material $M_2$ can be allowed to flow substantially equally into the outer layer forming material $M_1$ in the entire bumper main portion forming area $17_1$. In the bumper lower edge forming area $17_2$ of the cavity 17, the bumper lower edge $3_2$ made of only the core forming material $M_2$ is formed.

The bumper 3 produced in the above manner was excellent in quality and included the bumper main portion $3_1$ having a sandwich structure in its entirety, and the bumper lower edge $3_2$ having a single layer structure. For the bumper 3, the filling rate of the core forming material $M_2$ prepared from the recovered bumper is high, which is effective for providing a reduction in production cost of the bumper 3 and a resources saving.

If the injection speed Ve of the core forming material $M_2$ at the second step is set higher than the injection speed Va of the outer layer forming material $M_1$ at the second step, as shown in FIG. 10, it is possible to allow the a front portion of the core forming material $M_2$ as viewed in a flowing direction to catch up to a front portion of the outer layer forming material $M_2$ as viewed in a flowing direction. If the injection speed Ve of the core forming material $M_2$ is maintained at a higher level and the injection speed Vb of the outer layer forming material $M_1$ is maintained at a lower level at the third step, it is possible to allow the front portion of the core forming material $M_2$ in the flowing direction to reliably break through the front portion of the outer layer forming material $M_1$ in the flowing direction.

If the injection speed Vd of the outer layer forming material $M_1$ at the fourth step is set at a value lower than the final injection speed Vc of the outer layer forming material $M_1$ at the fourth step, the outer layer forming material $M_1$ cannot flow into the core forming material $M_2$ at the fourth step, whereby the gate communication portion of the bumper 3 can be formed from only the outer layer forming material $M_1$.

The outer layer forming material $M_1$ which may be used for the production of the bumper 3 includes the following examples:

COMPOSITION EXAMPLE 1

| Polypropylene | 63% by weight |
| --- | --- |
| Ethylene-propylene rubber | 30% by weight |
| Talc | 7% by weight |
| Weather-resistant stabilizer | 1 phr |
| Ultraviolet light absorber | 1 phr |
| Carbon black (pigment) | 3 phr |
| Coatability enhancing modifier | 3 phr |

COMPOSITION EXAMPLE 2

| | |
|---|---|
| Polypropylene | 60% by weight |
| Ethylene-propylene rubber | 30% by weight |
| Talc | 10% by weight |
| Weather-resistant stabilizer | 1 phr |
| Ultraviolet light absorber | 1 phr |
| Carbon black (pigment) | 3 phr |
| Coatability enhancing modifier | 3 phr |

In addition to those described above, the core forming material $M_2$ which may be used for the production of the bumper 3 includes the following examples:

(1) A forming material consisting of 93% by weight of a combination of a polypropylene and 7% by weight of talc. In this case, the polypropylene contains 30% by weight of a ethylene-propylene based rubber simultaneously synthesized at a step of polymerization of the polypropylene. The talc was added to the polypropylene at a final step of the synthesis of the polypropylene. This forming material is more inexpensive than a forming material containing a polypropylene and an ethylene-propylene rubber separately produced and blended.

(2) A forming material containing the following components:

| | |
|---|---|
| Polypropylene | 60% by weight |
| Ethylene-propylene rubber | 30% by weight |
| Talc | 10% by weight |

The entire upper edge of the bumper 3 including the mounting portion 3a may be thickened to have a thickness $t_1$.

What is claimed is:

1. A process for producing a molded article of a synthetic resin including a first construction portion having a sandwich structure comprised of a core and an outer layer covering the core, and a second construction portion integrally formed to the first construction portion and having a single-layer structure, said process comprising the steps of:

a first step of injecting an outer layer forming material into a molding cavity through a gate in a metal mold;

a second step of injecting a core forming material to allow said core forming material to flow into said outer layer forming material existing in said gate and said cavity and to allow said outer layer and core forming materials to flow into said cavity, therein advancing the formation of said first construction portion;

a third step of allowing a front portion of said core forming material in a flowing direction to break through a front portion of said outer layer forming material in the flowing direction and allowing said core forming material to flow into said cavity ahead of the outer layer material, therein advancing the formation of said second construction portion having the single-layer structure of the core forming material under advancement of the formation of said first construction portion having the sandwich structure; and a fourth step of pushing said outer layer and core forming materials of a double structure existing within said gate into said cavity by said outer layer material, therein completing the formation of said first and second construction portions.

2. The process according to claim 1, wherein said core forming material is a recovered material.

3. The process according to claim 1, wherein said outer layer forming material is polypropylene including a weather resistant stabilizer while said core forming material is polypropylene.

4. The process according to claim 1, wherein said molded article is an exterior member of an automobile.

5. A process for producing a molded article of a synthetic resin including a first construction portion having a sandwich structure comprised of a core and an outer layer covering the core, and a second construction portion integrally formed to the first construction portion and having a single-layer structure, said first construction portion assuming a conspicuous position while said second construction portion assuming a non-conspicuous position when said molded article is in use, said process comprising the steps of:

a first step of injecting an outer layer forming material made of polypropylene including a weather resistant stabilizer, into a molding cavity through a gate in a metal mold;

a second step of injecting a core forming material made of polypropylene, to allow said core forming material to flow into said outer layer forming material existing in said gate and said cavity and to allow said outer layer and core forming materials to flow into said cavity, therein advancing the formation of said first construction portion;

a third step of allowing a front portion of said core forming material in a flowing direction to break through a front portion of said outer layer forming material in the flowing direction and allowing said core forming material to flow into said cavity ahead of the outer layer material, therein advancing the formation of said second construction portion having the single-layer structure formed from said core forming material under advancement of the formation of said first construction portion having the sandwich structure; and a fourth step of pushing said outer layer and core forming materials of a double structure existing within said gate into said cavity by said outer layer material, therein completing the formation of said first and second construction portions.

6. The process according to claim 5, wherein said core forming material is a recovered material.

7. The process according to claim 6, wherein said molded article is a bumper of said automobile and said second construction portion assuming said non-conspicuous position is a lower portion of said bumper.

8. The process according to claim 5, wherein said molded article is an exterior member of an automobile.

* * * * *